(12) United States Patent
Butikofer

(10) Patent No.: US 6,678,579 B2
(45) Date of Patent: Jan. 13, 2004

(54) PUBLICATION-DISPENSING APPARATUS

(75) Inventor: Chet M. Butikofer, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/154,945

(22) Filed: May 23, 2002

(65) Prior Publication Data

US 2003/0220712 A1 Nov. 27, 2003

(51) Int. Cl.[7] ............................................. G06F 17/00
(52) U.S. Cl. ................................... 700/235; 700/233
(58) Field of Search ..................... 700/231, 232, 700/233, 235; 705/17

(56) References Cited

U.S. PATENT DOCUMENTS

| | | | |
|---|---|---|---|
| 4,532,554 A | 7/1985 | Skala | |
| 5,465,213 A | * 11/1995 | Ross | ............................ 700/117 |
| 5,615,123 A | 3/1997 | Davidson et al. | |
| 5,845,577 A | 12/1998 | Nelson et al. | |
| 5,850,520 A | 12/1998 | Griebenow et al. | |
| 5,860,362 A | 1/1999 | Smith | |
| 6,029,182 A | 2/2000 | Nehab et al. | |
| 6,125,388 A | 9/2000 | Reisman | |
| 6,295,482 B1 | 9/2001 | Tognazzini | |
| 6,306,072 B1 | 10/2001 | Honegger | |

* cited by examiner

*Primary Examiner*—Gene O Crawford

(57) ABSTRACT

A publication-dispensing apparatus that permits a user to select from among the publications in memory to which the user has a subscription, and to print at least a portion of a selected publication. The publication-dispensing apparatus permits travelers having a subscription to a newspaper, magazine, or other publication to obtain a copy of the subscribed publication, or a copy of an individual article from the subscribed publication, without paying the full cost of a new copy.

1 Claim, 3 Drawing Sheets

PUBLICATION-DISPENSING APPARATUS

BACKGROUND OF THE INVENTION

One of the frustrations of traveling, whether for business or for pleasure, is being unable to read the home town newspaper. Even on relatively short trips, the lack of daily news can be an irritation. On longer trips, or during short-term relocations, subscriptions to magazines and other periodicals are missed, increasing the stress and loneliness of being away from home. Alternatively, a traveler may require a particular publication for business reasons, or as part of a business assignment. The traveler may be in an area where their preferred publications are simply not available. Even where copies of a desired publication are available, the traveler who already has a subscription to his or her favorite magazine may be further inconvenienced if forced to pay full price for a copy of a publication that they have already paid for.

It would be significantly more convenient for travelers if a subscriber to a newspaper, magazine, or other publication could obtain a copy of that publication, or a copy of an individual article from such publications without paying the full cost of a new copy. Travelers could read their home town newspaper over breakfast, no matter how far from home they were.

SUMMARY OF THE INVENTION

A publication-dispensing apparatus that permits a user to select from among the publications in memory to which the user has a subscription, and to print at least a portion of a selected publication.

DETAILED DESCRIPTION OF THE PREFERRED EMBODIMENT

Figure 1:
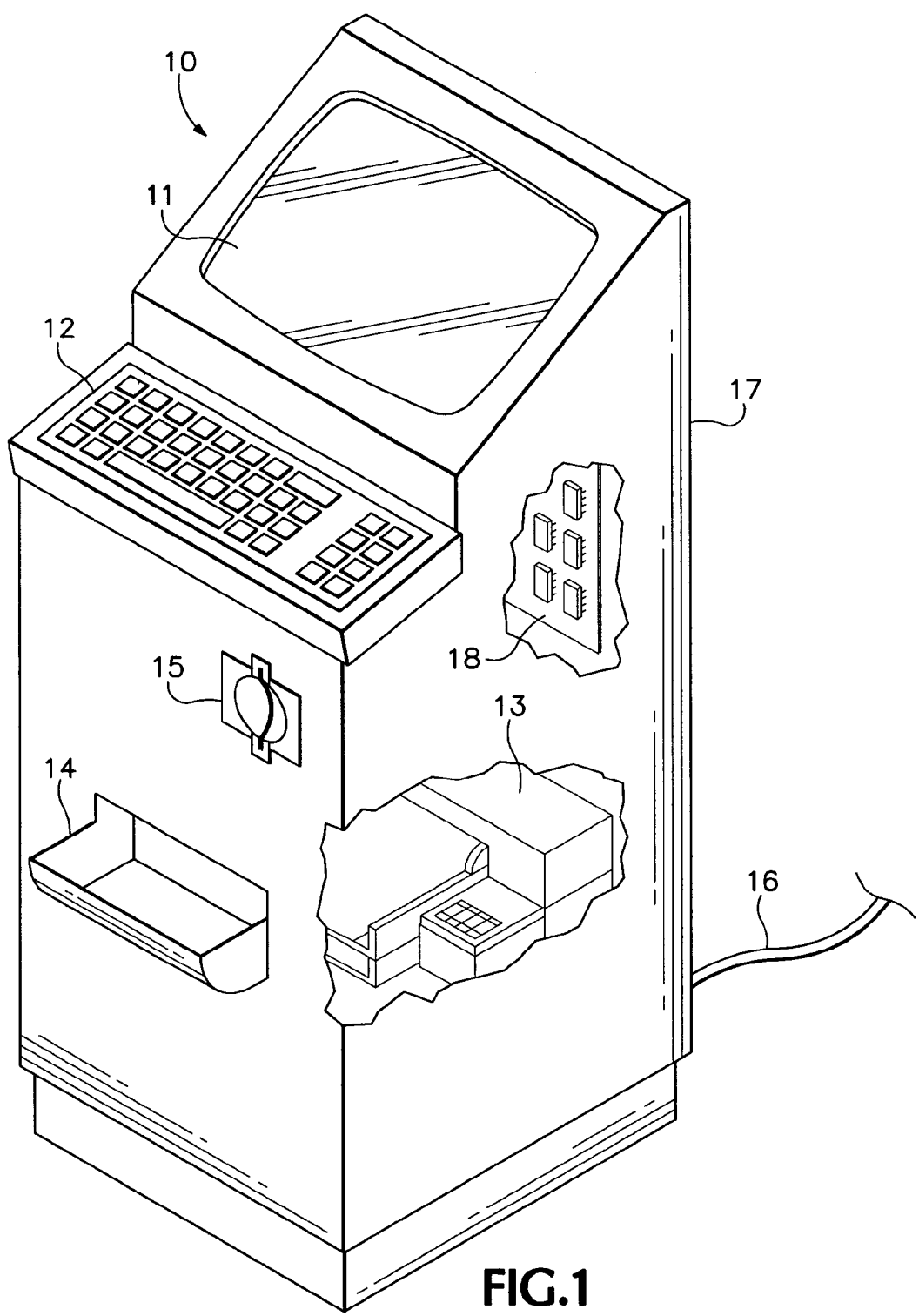
FIG. 1 is an isometric view of a publication-dispensing apparatus in accordance with one embodiment of the present invention.

An exemplary publication-dispensing apparatus in the form of a kiosk 10 is shown in FIG. 1. Kiosk 10 typically includes a chassis 17 that may house a display screen 11 and a keyboard 12. The display screen and keyboard, taken in combination, form a user interface that is in communication with a processor 18. As will be appreciated, the kiosk may further include a printer 13 for printing publications, and a dispenser 14 for dispensing such printed publications.

Printer 13 typically takes the form of a printer mechanism or print engine that is capable of printing a selected publication prior to dispensation to the user. Appropriate printers include, but are not limited to, dot-matrix printers, inkjet printers, electrophotographic printers (such as laser printers), etc. The printer may be a black-and-white printer, or a color printer, and may utilize simplex or duplex printing. Printer 13 may be configured to utilize any of a variety of suitable print media, including plain paper, coated paper, glossy paper, or transparencies, among others. Alternatively, printer 13 may include multiple distinct print media, with the selection of a particular type of media depending upon the nature of the publication selected, or an expressed user preference. The print media may be stored in discrete sheets, or as a continuous roll.

Dispenser 14 permits the user to take possession of the printed publication after printing, and may include, for example, a port or pass-through in chassis 17 of kiosk 10, a slot through which individual sheets may be fed, or a small chamber within kiosk 10 separated from the user and/or the interior of kiosk 10 by one or more 'one-way' doors that prevent the user from accessing the interior of kiosk 10. Either printer 13, or dispenser 14, or both, may incorporate one or more additional mechanisms that are configured to sort, collate, staple, and/or bind individual printed publications before they are dispensed. In one embodiment, the form of the printed output of kiosk 10 is selected by the user via the user interface.

Keyboard 12 permits the user to communicate with processor 18 in a manner that is both familiar and accessible to most users. However, a variety of additional suitable user interfaces exist for use in combination with, or in place of, the keyboard. Such additional user interfaces include, without limitation, a mouse, a trackball, a touchscreen display, a physical or wireless link to a personal digital device, a microphone (in conjunction with voice recognition software executed by the processor), etc.

Figure 2:
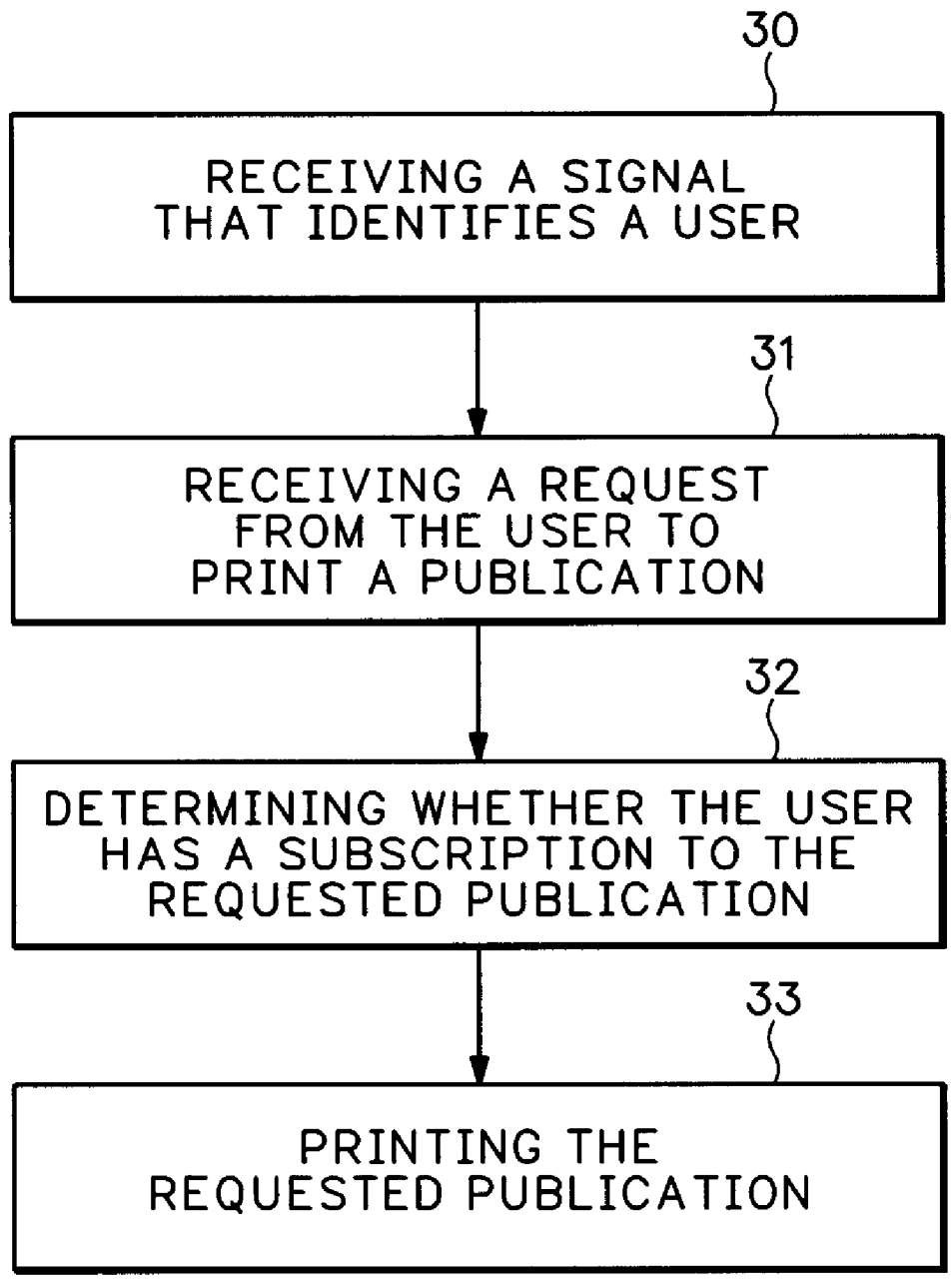
FIG. 2 is a flowchart depicting a method of printing a publication in accordance with one embodiment of the present invention.

A flow chart depicting illustrative steps of a method of printing a publication using a publication-dispensing apparatus is shown in FIG. 2. The method typically includes receiving a signal that identifies the user, at 30, and receiving a request from the user to print a publication, at 31. The apparatus then may determine whether the user has a subscription to the requested publication, at 32, and if he/she does, may print the requested publication, at 33. The just-described method may further include receiving a payment from the user, and verifying that the payment is acceptable before printing the selected publication.

Although presented in the form of a flow chart in FIG. 2, the above method is not limited to the precise steps in the particular order set out above. For example, a request to print a publication may be received before the user is identified, or a single signal may be received by the processor that identifies the user and also includes a request to print a publication. Similarly, the user may first select a publication for printing, whereupon the processor may subsequently verify that the user has a subscription to the selected publication. Alternatively, the user may first provide the processor with access to a record that includes the publications to which the user has subscribed, whereupon the processor may subsequently permit the user to select from among the user-subscribed publications for printing.

The processor typically receives the signal identifying the user via the user interface. Such a signal may include entering an identifier, such as a name, in conjunction with a password or PIN number. The name and PIN number could be entered via keyboard 12, or the user's identity could be encoded on a magnetic swipe card, with corroboration of the identity accomplished by entering the PIN number via the keyboard, as is commonly performed by automated teller machines. It should be appreciated that any other suitable means of identifying the user may be utilized according to the present invention, including for example retina scans, fingerprint scans, keycards, digital signatures, and the like.

In one embodiment of the invention, the user may provide the processor with access to a record that includes publications to which the user subscribes. The record may be a file stored on a network that is in communication with the processor, the user providing access to the record by identifying the record and/or providing a password or other means of accessing the record. Alternatively, the record may include a single publication, and have access by multiple subscribers. For example, a password identifying the user as a subscriber may be provided along with the traditional hard copy of the publication itself, so that subscribers to that issue may identify themselves as subscribers and obtain replacement or additional copies.

Alternatively, the record may be a file stored in a computer-readable medium, provided by the user, and accessible to the processor via the user interface. Appropriate computer-readable media may include, without limitation, magnetic cards, portable flash memory chips, magnetic disks, optical disks, provided that the kiosk includes an appropriate media reader, exemplified in FIG. 1 by magnetic card reader 15. Appropriate media readers are herein considered an aspect of the user interface, and include without limitation, magnetic (or swipe) card readers, memory chip communication ports (such as a USB port, for example), magnetic disk drives, optical disk drives, etc. Magnetic card readers include devices that can read industry standard magnetic stripe cards. Where the record is stored on a magnetic stripe card, the card may also perform one or more functions of a debit or credit card, so as to permit the user to provide access to the subscription record and provide a payment with a single magnetic stripe card. In yet another alternative embodiment, the record may be a file stored in a personal digital assistant device 21, that is accessible to the processor via a physical or wireless connection.

The processor may be configured to print the selected publication as soon as the user's subscription to the publication is verified. For example, a subscription to a particular publication may include utilization of the kiosk, so that once the processor receives the signal identifying the user, the selected publication would be provided at no additional cost. Alternatively, the processor may be configured to require payment of a fee from the user before printing the selected publication. Typically, the required fee to a subscriber to print a selected publication will be less than the fee to a non-subscribing user to print the same publication. That is, a subscription holder is provided with a copy of their selected publication at a reduced cost because they already hold a subscription to that publication.

Therefore, kiosk 10 may be configured to receive a payment from the user via the user interface, and verify the payment. Verification of the payment may include verifying that the amount paid is an appropriate amount, that the payment is authentic, or that the user is authorized to make the payment. The kiosk may be configured to receive a physical payment in currency, such as via a coin slot or bill slot. In this case verifying the payment may include verifying that the amount paid is appropriate, and that the payment is made in authentic currency (i.e., not counterfeit). For example, the kiosk may incorporate one or more mechanisms capable of verifying the amount and authenticity of a payment in currency as are generally utilized in a variety of vending machines. Alternatively, the kiosk may be configured to receive and verify an electronic fund transfer, such as by a debit or ATM card transaction, as exemplified in FIG. 1 by magnetic card reader 15. In this case the user may make an appropriate payment by swiping the debit or ATM card in card reader 15, or otherwise initiating the electronic fund transfer. The electronic payment is typically enabled and/or verified by providing the processor a PIN number, password, or other authorization of payment from an electronic payment service, such as a bank account (including savings accounts, checking accounts, credit card and debit card accounts) or Internet-based electronic currency accounts. The transfer may be authorized via the user interface, or the processor may access a file containing the necessary authorization stored on a personal digital device via a physical or wireless connection.

Kiosk 10 may optionally permit the user to preview the selected publication before the publication is printed, or perhaps more importantly, before payment is received from the user. Such a preview may utilize display 11 to provide a 'thumbnail' image of the publication, or to display the title and/or the first paragraph of the selected publication. Previewing the selected publication may include browsing the previews of multiple selected publications before printing.

In order to facilitate retrieval of selected publications, verify subscription information, and accept and verify user payments, kiosk 10 is typically in communication with a network 20 via a network connection 16, as illustrated in FIG. 1, and depicted schematically in FIG. 2. Network 20 may be a local area network (or LAN), or a wide area network (WAN) such as the Internet. In the embodiment shown in FIG. 3, network 20 may also provide access to subscriber information 22, which may identify the subscriptions which the user has purchased. Network 20 also provides for contact with an electronic payment service 23, as discussed above.

Figure 3:
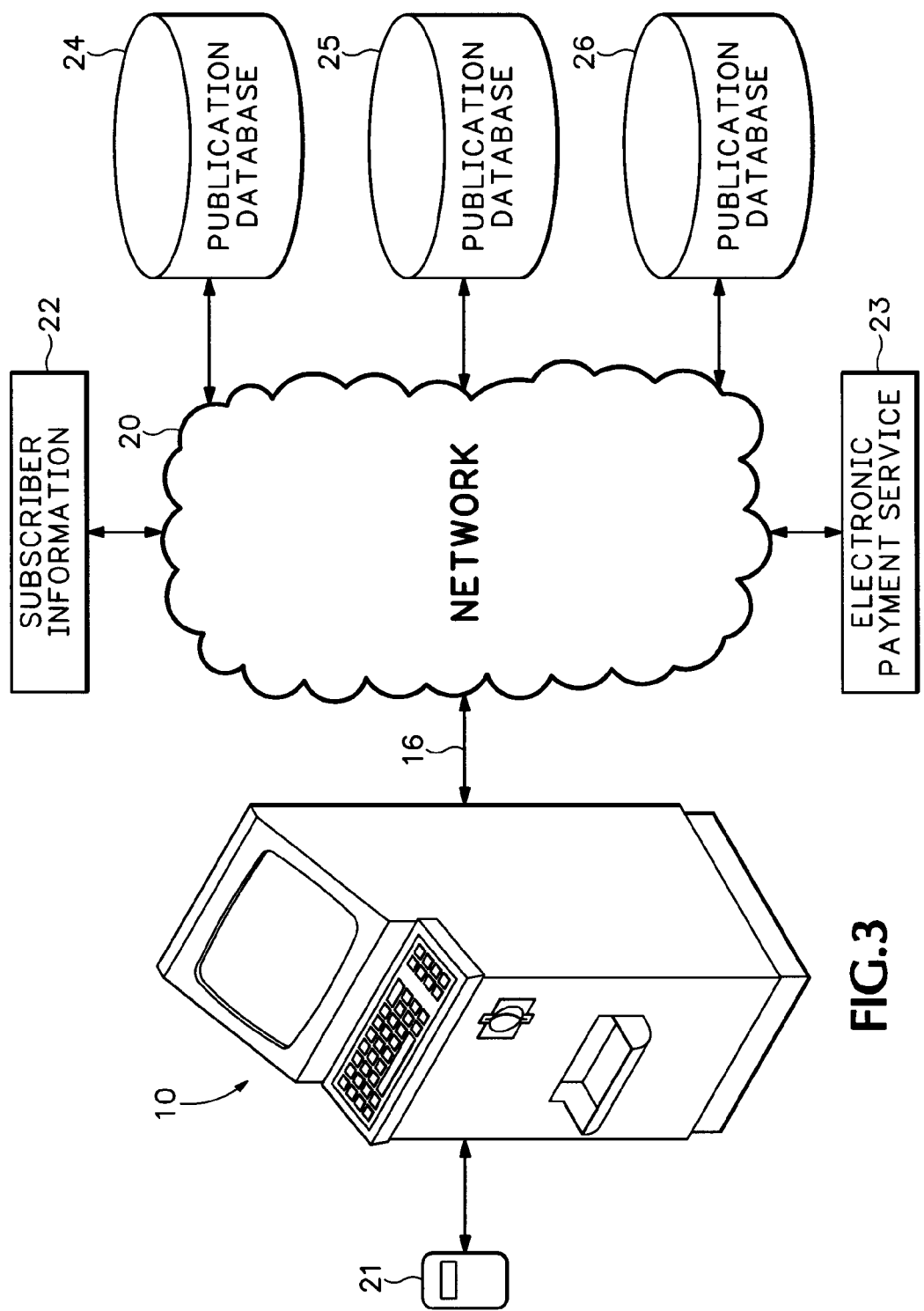
FIG. 3 is a schematic showing the publication-dispensing apparatus of FIG. 1 in communication with a publication database via a network.

Processor 18 of kiosk 10 may be in communication with one or more electronic databases of publications. The database of publications may be localized within the kiosk itself, such as on a CD-ROM or other storage device. Alternatively, the apparatus may be in communication with an off-site electronic database of publications, for example, via a cable connection or a wireless connection. It will be appreciated that maintaining a separate content database for each kiosk would require frequent updates of the database, either manually or remotely. Thus it may be preferable to maintain a common publication database that is shared by plural kiosks. Each processor may then be in communication with the database via a network connection. As shown in FIG. 3, one or more such common publication databases 24–26 may be in communication with kiosk 10 via network 20, each representing a different set of available publications. Alternatively, the database may include the content of relatively few publications, or only one publication, and may be made available on a computer-readable medium. For example, a magnetic card, magnetic disk, or optical disk may include an electronic version of one or more publications. The user could then provide the computer-readable medium to the apparatus and request that one or more publications stored thereon be printed. For example, a computer-readable medium may be provided with the traditional subscriber copy of the publication that includes an electronic version of that publication. The computer-readable medium supplied with a publication may also include additional content or additional publications.

Publication databases 24–26 may include any of a variety of publication types, including newspapers, magazines, almanacs, dictionaries, encyclopedias, literary journals, scientific journals, etc. Processor 18, working in conjunction with at least one database 24–26, may be configured to provide for printing of a single selected issue of a magazine, newspaper, or journal. Alternatively, processor 18 and databases 24–26 may be configured to provide for printing of a single selected article, or portion of a selected magazine, newspaper, journal, etc.

Utilization of the kiosk may be exemplified by the following transaction. A business traveler approaches kiosk 10, and presses a button on keyboard 12 to initiate a transaction. Processor 18 presents a message on display 11, presenting several options, including for example, a subscriber login or non-subscriber purchasing of a publication. The user selects subscriber login using keyboard 12, and upon prompting by display 11, inserts an appropriate magnetic card in card reader 15. Processor 18 accesses the user's subscription information 22 via network 20, and presents a message on display 11 greeting the user and requesting a PIN number, which the user enters on keyboard 12. Processor 18 then displays the publications to which the user has a subscription. The user selects one of the publications to which the user has a subscription, using keyboard 12. Processor 18 then requests payment of a reduced subscriber fee for printing the selected news magazine. The user then swipes a debit card using card reader 15, and in response to a prompt on display 11, enters an appropriate PIN number to charge the account associated with the debit card. Processor 18 accesses the user's debit card account via an electronic payment service 23 (such as a bank) via network 20 and verifies the appropriate payment. Upon verification, processor 18 accesses electronic publication database 25, downloads the electronic copy of the selected publication, and sends it as a print job to printer 13. Upon printing the selected publication, the publication is deposited in dispenser 14, where the user can retrieve it.

While the publication-dispensing apparatus of the invention has been depicted as a kiosk, the particular arrangement of processor, printer, user interface, or method of payment is a matter of choice for the skilled artisan. The apparatus of the invention is not limited to a free-standing vending machine, but may be incorporated into a wall or bulkhead. Alternatively, the user interface and dispensing mechanism may be located remotely from the processor. The present invention is intended to embrace all such alternatives, modifications and variances which fall within the scope of the appended claims.

What is claimed is:

1. A method of printing a publication at a kiosk, the method comprising:

receiving a request from a user to print a publication;

determining whether the user has a subscription to the requested publication;

upon determining that the user does have a subscription to the requested publication, receiving payment from the user, retrieving the requested publication from memory and printing the requested publication; and upon determining that the user does not have a subscription, receiving a payment from the user retrieving the requested publication from memory, and printing the requested publication, wherein payment required from a subscribing user is less than a corresponding payment required from a non-subscribing user.

* * * * *

UNITED STATES PATENT AND TRADEMARK OFFICE
CERTIFICATE OF CORRECTION

PATENT NO.    : 6,678,579 B2
DATED         : January 12, 2004
INVENTOR(S)   : Chet M. Butikofer It is certified that error appears in the above-identified patent and that said Letters Patent is hereby corrected as shown below:

<u>Column 6,</u>
Line 22, after "user" and before "does" insert -- , --

Signed and Sealed this

Eighteenth Day of January, 2005

JON W. DUDAS
*Director of the United States Patent and Trademark Office*